(12) United States Patent
Lee et al.

(10) Patent No.: US 9,983,750 B2
(45) Date of Patent: May 29, 2018

(54) IN-CELL MUTUAL-CAPACITIVE TOUCH PANEL

(71) Applicant: Raydium Semiconductor Corporation, Hsinchu (TW)

(72) Inventors: Kun-Pei Lee, Zhunan Township (TW); Yi-Ying Lin, Hualien (TW); Chang-Ching Chiang, Taichung (TW); Yu-Chin Hsu, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 79 days.

(21) Appl. No.: 15/164,563

(22) Filed: May 25, 2016

(65) Prior Publication Data
US 2016/0282995 A1   Sep. 29, 2016

Related U.S. Application Data

(63) Continuation-in-part of application No. 14/858,457, filed on Sep. 18, 2015, now Pat. No. 9,891,745.

(60) Provisional application No. 62/065,278, filed on Oct. 17, 2014, provisional application No. 62/166,101, filed on May 25, 2015.

(51) Int. Cl.
  *G06F 3/041*   (2006.01)
  *G06F 3/044*   (2006.01)

(52) U.S. Cl.
  CPC ............ *G06F 3/044* (2013.01); *G06F 3/0412* (2013.01); *G06F 3/0416* (2013.01); *G06F 2203/04112* (2013.01)

(58) Field of Classification Search
  CPC ....... G06F 3/0412; G06F 3/0416; G06F 3/044
  See application file for complete search history.

(56) References Cited

U.S. PATENT DOCUMENTS

| | | | | |
|---|---|---|---|---|
| 2010/0194696 | A1* | 8/2010 | Chang | G06F 3/0412 345/173 |
| 2014/0125626 | A1* | 5/2014 | Yang | G02F 1/134336 345/174 |
| 2014/0210774 | A1* | 7/2014 | Kim | G06F 3/044 345/174 |
| 2015/0355762 | A1* | 12/2015 | Tripathi | G06T 1/20 345/173 |
| 2015/0378472 | A1* | 12/2015 | Hekstra | G06F 3/044 345/17 |
| 2016/0026289 | A1* | 1/2016 | Liu | G06F 3/044 345/174 |
| 2016/0188029 | A1* | 6/2016 | Liu | G02F 1/13338 345/174 |

* cited by examiner

*Primary Examiner* — Ryan A Lubit

(57) ABSTRACT

An in-cell mutual-capacitive touch panel is disclosed. The in-cell mutual-capacitive touch panel includes a plurality of pixels. A laminated structure of each pixel includes a substrate, a TFT layer, a liquid crystal layer, a color filter layer and a glass layer. The TFT layer is disposed on the substrate. A first conductive layer and a common electrode are disposed in the TFT layer. The first conductive layer is arranged in mesh type or only arranged along a first direction in an active area of the in-cell mutual-capacitive touch panel. The liquid crystal layer is disposed above the TFT layer. The color filter layer is disposed above the liquid crystal layer. The glass layer is disposed above the color filter layer.

21 Claims, 13 Drawing Sheets

1

| |
|---|
| Top lens 18 |
| Adhesive 17 |
| Polarizer 16 |
| Touch sensing layer 15 |
| Glass layer 14 |
| Color filtering layer 13 |
| Liquid crystal layer 12 |
| TFT layer 11 |
| Substrate 10 |

| |
|---|
| Top lens 28 |
| Adhesive 27 |
| Polarizer 26 |
| Glass layer 25 |
| Color filtering layer 24 |
| Liquid crystal layer 23 |
| Touch sensing layer 22 |
| TFT layer 21 |
| Substrate 20 |

FIG. 2 (PRIOR ART)

IN-CELL MUTUAL-CAPACITIVE TOUCH PANEL

BACKGROUND OF THE INVENTION

Field of the Invention

This invention relates to a touch panel, especially to an in-cell mutual-capacitive touch panel.

Description of the Related Art

In general, there are several different laminated structures of the capacitive touch panel, for example, an in-cell capacitive touch panel or an on-cell capacitive touch panel.

Please refer to FIG. 1 and FIG. 2. FIG. 1 and FIG. 2 illustrate two different laminated structures of the in-cell capacitive touch panel and the on-cell capacitive touch panel respectively. As shown in FIG. 1, the laminated structure 1 of the on-cell capacitive touch panel includes a substrate 10, a thin-film transistor layer 11, a liquid crystal layer 12, a color filtering layer 13, a glass layer 14, a touch sensing layer 15, a polarizer 16, an adhesive 17, and top lens 18. As shown in FIG. 2, the laminated structure 2 of the in-cell capacitive touch panel includes a substrate 20, a thin-film transistor layer 21, a touch sensing layer 22, a liquid crystal layer 23, a color filtering layer 24, a glass layer 25, a polarizer 26, an adhesive 27, and top lens 28.

After comparing FIG. 1 with FIG. 2, it can be found that the touch sensing layer 22 of the in-cell capacitive touch panel is disposed under the liquid crystal layer 23; that is to say, the touch sensing layer 22 is disposed in the liquid crystal display module of the in-cell capacitive touch panel. On the other hand, the touch sensing layer 15 of the on-cell capacitive touch panel is disposed above the glass layer 14; that is to say, the touch sensing layer 15 is disposed out of the liquid crystal display module of the on-cell capacitive touch panel. Therefore, compared to the conventional one glass solution (OGS) and on-cell capacitive touch panel, the in-cell capacitive touch panel can achieve thinnest touch panel design and widely used in portable electronic products such as mobile phones, tablet PCs, and notebooks.

Therefore, the invention provides an in-cell mutual-capacitive touch panel to solve the above-mentioned problems.

SUMMARY OF THE INVENTION

Therefore, the invention provides an in-cell mutual-capacitive touch panel to solve the above-mentioned problems.

A preferred embodiment of the invention is an in-cell touch panel. In this embodiment, the in-cell touch panel includes a plurality of pixels. A laminated structure of each pixel includes a substrate, a TFT layer, a liquid crystal layer, a color filter layer and a glass layer. The TFT layer is disposed on the substrate. A first conductive layer and a common electrode are disposed in the TFT layer. The first conductive layer is arranged in mesh type or only arranged along a first direction in an active area of the in-cell mutual-capacitive touch panel. The liquid crystal layer is disposed above the TFT layer. The color filter layer is disposed above the liquid crystal layer. The glass layer is disposed above the color filter layer.

In an embodiment, touch electrodes of the in-cell mutual-capacitive touch panel includes a first direction electrode and a second direction electrode, the first direction electrode is formed by the first conductive layer arranged in mesh type and the second direction electrode is formed by the first conductive layer arranged along the first direction in the active area electrically connected with the common electrode through a via.

In an embodiment, the first direction electrode and the second direction electrode are a driving electrode and a sensing electrode respectively or the first direction electrode and the second direction electrode are the sensing electrode and the driving electrode respectively.

In an embodiment, a multi-function electrode is disposed between the first direction electrode and the second direction electrode; the multi-function electrode is formed by the first conductive layer arranged along the first direction in the active area electrically connected with the common electrode through a via.

In an embodiment, the first conductive layer is formed after the common electrode is formed.

In an embodiment, the first conductive layer is formed before the common electrode is formed.

In an embodiment, the color filter layer includes a color filter and a black matrix resist, the black matrix resist has good light resistance, and the first conductive layer is disposed under the black matrix resist.

In an embodiment, a part of the first conductive layer not forming the touch electrode is electrically connected with a part of the common electrode corresponding to the first direction electrode to reduce RC loading of the common electrode.

In an embodiment, the thin-film transistor layer further includes an original conductive layer; the original conductive layer is electrically connected with the common electrode to reduce RC loading of the common electrode.

In an embodiment, when the laminated structure has a half source driving (HSD) structure, the laminated structure includes an additional vacated source line space for electrically connecting an original conductive layer of the thin-film transistor layer with the first conductive layer or the common electrode.

In an embodiment, the original conductive layer and a source and a drain of the thin-film transistor layer are formed simultaneously.

In an embodiment, the second direction electrodes in the same channel are electrically connected in a border area of the in-cell mutual-capacitive touch panel through traces.

In an embodiment, a part of the common electrode corresponding to the first direction electrode is electrically connected with another part of the common electrode in a border area of the in-cell mutual-capacitive touch panel.

In an embodiment, the multi-function electrode is electrically connected with other multi-function electrodes in a border area of the in-cell mutual-capacitive touch panel through traces.

In an embodiment, traces of the second direction electrode are uniformly disposed or different numbers of the traces are disposed in different regions.

In an embodiment, the active area of the in-cell mutual-capacitive touch panel is surrounded by traces of the multi-function electrode in the border area of the in-cell mutual-capacitive touch panel.

In an embodiment, a plurality of the first direction electrode is divided into a first group of electrodes and a second group of electrodes; traces of the first group of electrodes pass through the second group of electrodes without any electrical connections.

In an embodiment, two first direction electrodes of the second group of electrodes are electrically connected.

In an embodiment, a part of the common electrode corresponding to the first group of electrodes and another part of the common electrode corresponding to the second group of electrodes are belonged to the same common electrode region or different common electrode regions respectively.

In an embodiment, when the in-cell mutual-capacitive touch panel is operated in a touch mode, the common electrode is switched to a floating state or provided a touch related signal having the same frequency, the same amplitude or the same phase with a touch signal.

In an embodiment, a touch mode and a display mode of the in-cell mutual-capacitive touch panel are driven in a time-sharing way; the in-cell mutual-capacitive touch panel is operated in the touch mode during a blanking interval of a display period.

In an embodiment, the blanking interval includes at least one of a vertical blanking interval (VBI), a horizontal blanking interval (HBI), and a long horizontal blanking interval (LHBI); a time length of the LHBI is equal to or larger than a time length of the HBI; the LHBI is obtained by redistributing a plurality of HBIs or the LHBI includes the VBI.

In an embodiment, the common electrode has a plurality of common electrode regions overlapped with a plurality of touch electrodes of the in-cell mutual-capacitive touch panel respectively; when the in-cell mutual-capacitive touch panel is operated in the touch mode, the plurality of touch electrodes is provided a plurality of touch signals in order and the common electrode is provided a plurality of touch related signals having the same frequency, the same amplitude or the same phase with the plurality of touch signals in order correspondingly or the common electrode is in a floating state.

In an embodiment, the plurality of touch electrodes is driving electrodes or sensing electrodes.

Compared to the prior arts, the in-cell mutual-capacitive touch panel of the invention has the following advantages and effects:

(1) Designs of the touch sensing electrodes and their traces in the in-cell mutual-capacitive touch panel of the invention are simple.

(2) he original aperture ratio of the in-cell mutual-capacitive touch panel will not affected by the layout method of the invention.

(3) The RC loading of the common electrode can be reduced.

(4) When the in-cell mutual-capacitive touch panel is operated in touch mode, the common electrode is controlled simultaneously to reduce entire RC loading of the in-cell mutual-capacitive touch panel.

(5) The touch mode and the display mode of the in-cell mutual-capacitive touch panel are driven in a time-sharing way to enhance the signal-noise ratio (SNR).

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 and FIG. 2 illustrate schematic diagrams of the laminated structures of the conventional in-cell and on-cell capacitive touch panels respectively.

DETAILED DESCRIPTION

A preferred embodiment of the invention is an in-cell touch panel. In practical applications, the in-cell touch panel is an in-cell mutual-capacitive touch panel, but not limited to this.

In this embodiment, the in-cell touch panel includes a plurality of pixels. A laminated structure of each pixel includes a substrate, a TFT layer, a liquid crystal layer, a color filter layer and a glass layer. The TFT layer is disposed on the substrate. The first conductive layer is arranged in mesh type. The liquid crystal layer is disposed above the TFT layer. The color filter layer is disposed above the liquid crystal layer. The glass layer is disposed above the color filter layer. A first conductive layer and a common electrode are disposed in the TFT layer.

It should be noticed that the first conductive layer of the invention is arranged in mesh type or only arranged along a first direction in an active area of the in-cell mutual-capacitive touch panel. Touch electrodes of the in-cell mutual-capacitive touch panel includes a first direction electrode and a second direction electrode, wherein the first direction electrode is formed by the first conductive layer arranged in mesh type and the second direction electrode is formed by the first conductive layer arranged along the first direction in the active area electrically connected with the common electrode through a via. In fact, the first direction electrode and the second direction electrode can be used as a driving electrode and a sensing electrode for mutual-capacitive sensing respectively or the first direction electrode and the second direction electrode can be used as the sensing electrode and the driving electrode for mutual-capacitive sensing respectively without specific limitations.

Figure 3:
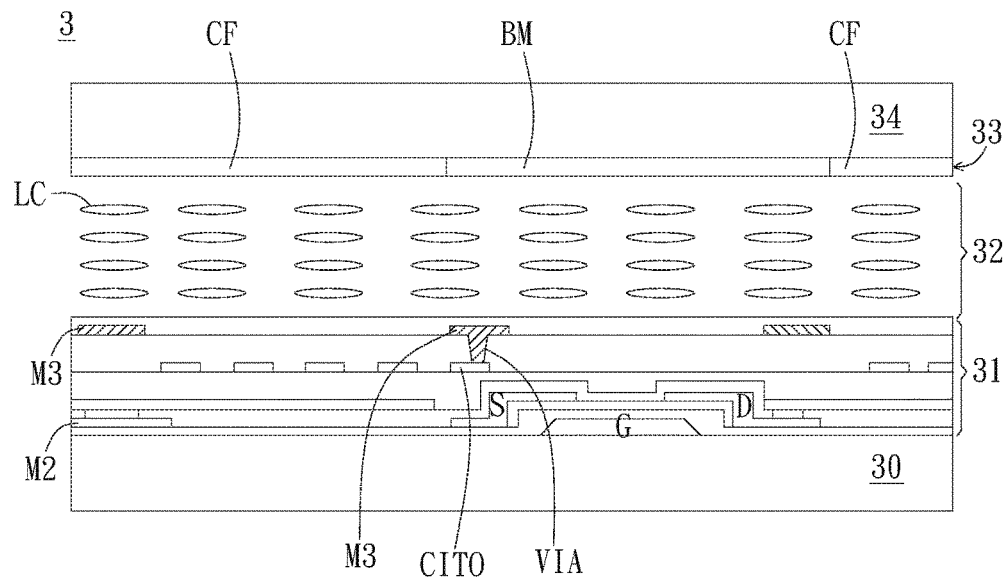
FIG. 3 illustrates a cross-sectional schematic diagram of the laminated structure of the in-cell mutual-capacitive touch panel in an embodiment of the invention.

Please refer to FIG. 3. FIG. 3 illustrates a cross-sectional schematic diagram of the laminated structure of the in-cell mutual-capacitive touch panel in the first embodiment of the invention. As shown in FIG. 3, the laminated structure 3 of the in-cell mutual-capacitive touch panel includes a substrate 30, a thin-film transistor (TFT) layer 31, a liquid crystal layer 32, a color filter layer 33 and a glass layer 34. The color filter layer 33 includes a color filter CF and a black matrix resist BM, wherein the black matrix resist BM has good light resistance and can be used in the color filter layer 33 as the material of color filter to separate the three colors: red (R), green (G) and blue (B).

In this embodiment, a first conductive layer M3 and a common electrode CITO are disposed in the TFT layer 31, and the first conductive layer M3 is formed after the common electrode CITO. The first conductive layer M3 can be arranged in mesh type or only arranged along a first direction in an active area of the in-cell mutual-capacitive touch panel. The first conductive layer M3 is disposed under the black matrix resist BM, so that the black matrix resist BM having good light resistance can shield the underlying first conductive layer M3.

It should be noticed that the touch electrodes of the in-cell mutual-capacitive touch panel of the invention includes a first direction electrode and a second direction electrode. As shown in FIG. 3, the first conductive layer M3 not electrically connected with the common electrode CITO is arranged in mesh type to form the first direction electrode; the first conductive layer M3 electrically connected with the common electrode CITO through the via VIA is arranged along the first direction in the active area of the in-cell mutual-capacitive touch panel to form the second direction electrode.

When the in-cell mutual-capacitive touch panel of the invention performs mutual-capacitive sensing, if the first direction electrode (namely the first conductive layer M3 arranged in mesh type) is used as driving electrodes, then the second direction electrode (namely the first conductive layer M3 electrically connected with the common electrode CITO) is used as sensing electrodes; on the contrary, if the first direction electrode is used as the sensing electrodes, then the second direction electrode is used as the driving electrodes.

Figure 4:
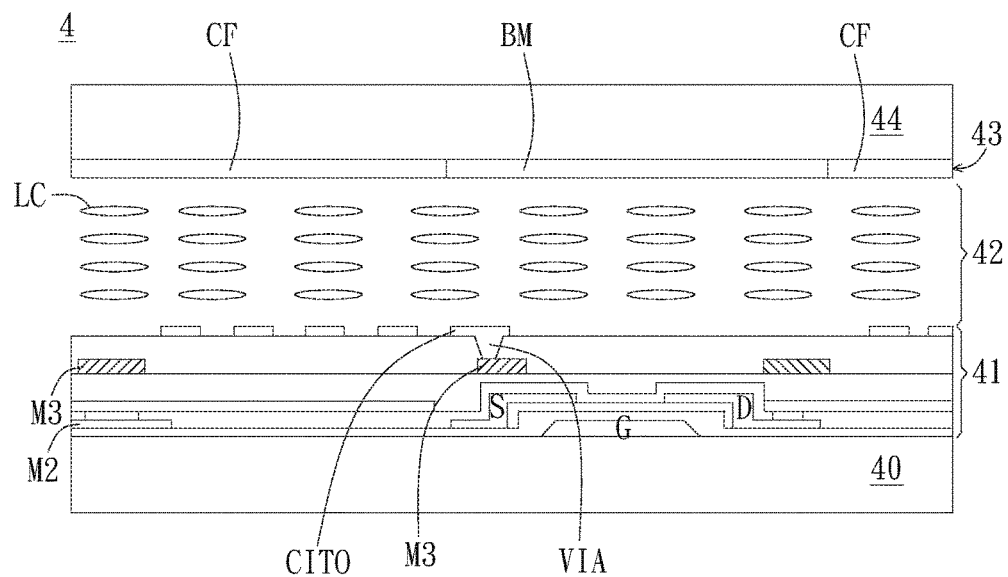
FIG. 4 illustrates a cross-sectional schematic diagram of the laminated structure of the in-cell mutual-capacitive touch panel in another embodiment of the invention.

Then, please refer to FIG. 4. FIG. 4 illustrates a cross-sectional schematic diagram of the laminated structure of the in-cell mutual-capacitive touch panel in another embodiment of the invention. As shown in FIG. 4, the laminated structure 4 of the in-cell mutual-capacitive touch panel includes a substrate 40, a TFT layer 41, a liquid crystal layer 42, a color filter layer 43 and a glass layer 44. The color filter layer 43 includes a color filter CF and a black matrix resist BM, wherein the black matrix resist BM has good light resistance and can be used in the color filter layer 43 as the material of color filter to separate the three colors: red (R), green (G) and blue (B).

In this embodiment, a first conductive layer M3 and a common electrode CITO are disposed in the TFT layer 41, and the first conductive layer M3 is formed before the common electrode CITO. The first conductive layer M3 can be arranged in mesh type or only arranged along a first direction in an active area of the in-cell mutual-capacitive touch panel. The first conductive layer M3 is disposed under the black matrix resist BM, so that the black matrix resist BM having good light resistance can shield the underlying first conductive layer M3.

It should be noticed that the touch electrodes of the in-cell mutual-capacitive touch panel of the invention includes a first direction electrode and a second direction electrode. As shown in FIG. 4, the first conductive layer M3 not electrically connected with the common electrode CITO is arranged in mesh type to form the first direction electrode; the first conductive layer M3 electrically connected with the common electrode CITO through the via VIA is arranged along the first direction in the active area of the in-cell mutual-capacitive touch panel to form the second direction electrode.

When the in-cell mutual-capacitive touch panel of the invention performs mutual-capacitive sensing, if the first direction electrode (namely the first conductive layer M3 arranged in mesh type) is used as driving electrodes, then the second direction electrode (namely the first conductive layer M3 electrically connected with the common electrode CITO) is used as sensing electrodes; on the contrary, if the first direction electrode is used as the sensing electrodes, then the second direction electrode is used as the driving electrodes.

Figure 5:
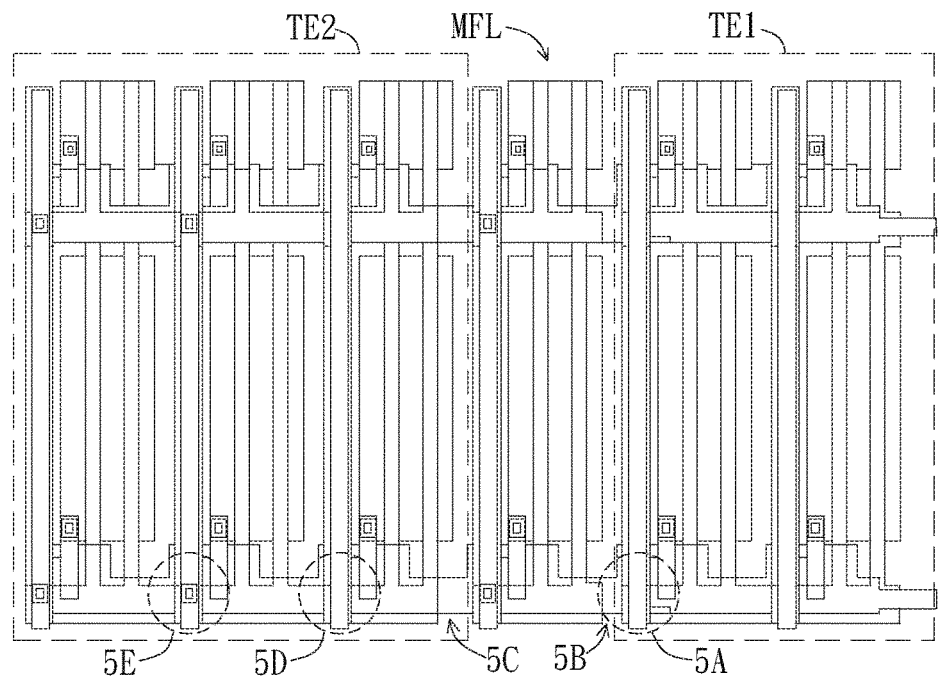
FIG. 5 illustrates an embodiment of the pixel design of the in-cell mutual-capacitive touch panel of the invention.

Please refer to FIG. 5. FIG. 5 illustrates an embodiment of the pixel design of the in-cell mutual-capacitive touch panel of the invention. As shown in FIG. 5, the multi-function electrode MFL can be disposed between the first direction electrode TE1 and the second direction electrode TE2. In practical applications, the multi-function electrode MFL can be formed by the first conductive layer M3 arranged along the first direction in the active area of the in-cell mutual-capacitive touch panel electrically connected with the common electrode CITO through the via VIA, but not limited to this.

As shown in FIG. 5, the dotted-line range 5A shows that the common electrode CITO and the first conductive layer M3 are insulated from each other; the dotted-line ranges 5B and 5C show that the common electrode CITO is disconnected; the dotted-line range 5D shows that the common electrode CITO and the first conductive layer M3 are insulated from each other; the dotted-line range 5E shows that the common electrode CITO and the first conductive layer M3 are electrically connected.

Figure 6:
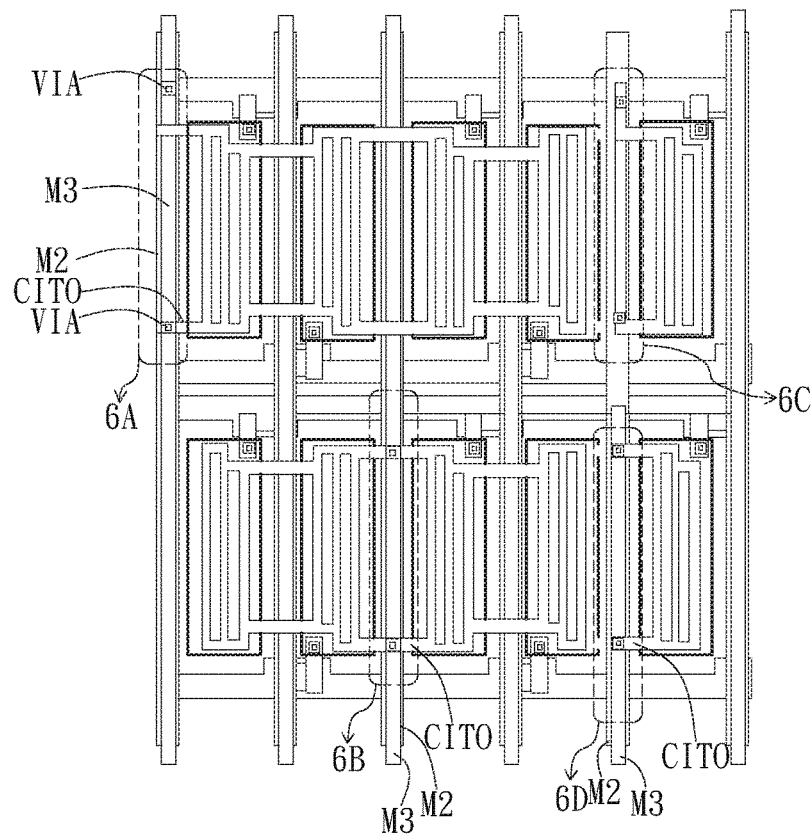
FIG. 6 illustrates a schematic diagram of the laminated structure of the in-cell mutual-capacitive touch panel having the HSD structure.

Please refer to FIG. 6. FIG. 6 illustrates a schematic diagram of the laminated structure of the in-cell mutual-capacitive touch panel having the HSD structure. As shown in FIG. 6, when the laminated structure uses pixel design of the HSD structure, the laminated structure will include an additional vacated source line space for electrically connecting an original conductive layer of the thin-film transistor layer with the first conductive layer or the common electrode, but not limited to this. In fact, the original conductive layer and a source and a drain of the TFT layer can be formed at the same time.

For example, as shown in FIG. 6, the dotted-line range 6A shows that the additional original conductive layer M2 is electrically connected with the first conductive layer M3 through the via VIA, so that it can be parallel to the trace of the common electrode CITO to generate the double traces effect, wherein the first conductive layer M3 and the common electrode CITO are electrically connected and only has one direction traces; the dotted-line range 6B shows that the first conductive layer M3 and the common electrode CITO in the electrode range are electrically connected through the via VIA, wherein the first conductive layer M3 and the common electrode CITO are electrically connected and only has one direction traces; the dotted-line range 6C shows that the additional original conductive layer M2 is used as traces of the common electrode CITO corresponding to the first conductive layer M3 arranged in mesh type to reduce the RC loading of the common electrode CITO; the dotted-line range 6D shows that a part of the first conductive layer M3 not forming touch electrodes is electrically connected with a part of the common electrode CITO corresponding to the first direction electrode to be used as traces of the common electrode CITO to reduce the RC loading of the common electrode CITO.

Figure 7:
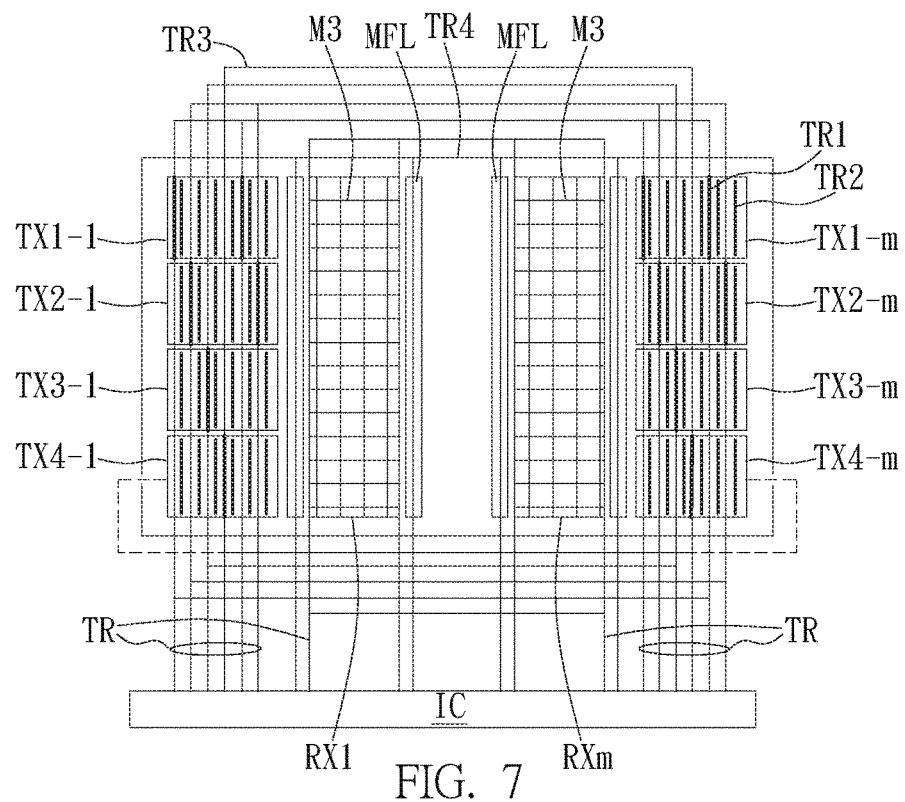
FIG. 7 illustrates a first embodiment of the layout of the in-cell mutual-capacitive touch panel of the invention.

Please refer to FIG. 7. FIG. 7 illustrates a first embodiment of the layout of the in-cell mutual-capacitive touch panel of the invention. In this embodiment, the in-cell mutual-capacitive touch panel uses the second direction electrode as the touch driving electrode (TX) and the first direction electrode as the touch sensing electrode (RX), but not limited to this. As shown in FIG. 7, it is assumed that the touch driving electrodes TX1-1~TX1-$m$ belong to the same channel TX1, the touch driving electrodes TX2-1~TX2-$m$ belong to the same channel TX2, the touch driving electrodes TX3-1~TX3-$m$ belong to the same channel TX3 and the touch driving electrodes TX4-1~TX4-$m$ belong to the same channel TX4. Taking the channel TX1 for example, horizontal traces TR3 are disposed above and under the in-cell mutual-capacitive touch panel to connect the touch driving electrodes TX1-1~TX1-$m$ belong to the same channel TX1 to achieve the double routing design and reduce the resistance. In addition, because the touch driving electrodes TX1-1~TX1-$m$ at the right side and the left side have traces TR entering into the control circuit IC respectively, the aim of multi-region driving can be achieved to reduce the RC loading. About the other channels TX2~TX4, since they are similar to the above-mentioned channel TX1, they will not be repeated here. As to the traces TR of the touch sensing electrodes RX1 and RXm, they enter into the control circuit IC respectively; the traces TR of the multi-function electrodes MFL are connected together and then enter into the control circuit IC respectively.

The touch sensing electrodes RX1 and RXm are formed by the first conductive layer M3 arranged in mesh type. A part of the common electrode CITO corresponding to the touch sensing electrodes RX1 and RXm are electrically connected with the other parts of the common electrode CITO in the border area of the in-cell mutual-capacitive touch panel. And, a part of the first conductive layer M3 not forming the touch electrodes is used as the traces of the part of the common electrode CITO corresponding to the touch sensing electrodes RX1 and RXm to reduce the resistance. The touch driving electrodes TX1-1~TX4-1 and TX1-$m$~TX4-$m$ are electrically connected with the touch driving electrodes of the same channel in the border area of the in-cell mutual-capacitive touch panel through the traces TR3 and use the traces TR1 to electrically connect the common electrode CITO in the region corresponding to the touch driving electrode through the via VIA to achieve the double routing design to reduce the resistance. The multi-function electrodes MFL are electrically connected with the other multi-function electrodes MFL in the border area of the in-cell mutual-capacitive touch panel through the traces TR4 and use the traces to electrically connect with the common electrode CITO in the region corresponding to the multi-function electrode MFL through the via VIA to achieve the double routing design to reduce the resistance.

Figure 8:
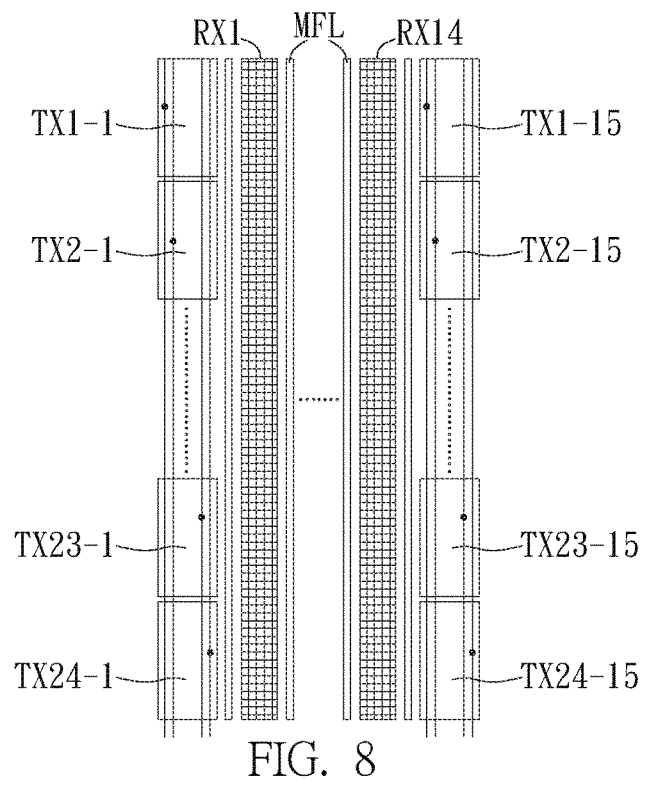
FIG. 8 illustrates a schematic diagram of the touch driving electrodes (TX) having 24 channels along the vertical direction and the touch sensing electrodes (RX) having 14 channels along the horizontal direction.

In practical applications, the traces TR1 of the touch driving electrodes TX1-1~TX4-1 and TX1-$m$~TX4-$m$ can be uniformly disposed or different numbers of the traces TR1 are disposed in different regions to achieve the best RC loading design. Taking the touch driving electrodes TX1-1~TX4-1 for example, two traces TR1 are disposed in each of the touch driving electrodes TX1-1~TX2-1 respectively and one trace TR1 is disposed in each of the touch driving electrodes TX3-1~TX4-1 respectively, but not limited to this. In addition, the active area of the in-cell mutual-capacitive touch panel is surrounded by the traces TR4 of the multi-function electrode MFL in the border area of the in-cell mutual-capacitive touch panel to achieve the shielding effect. Please also refer to FIG. 8. FIG. 8 illustrates a schematic diagram of the touch driving electrodes (TX) having 24 channels along the vertical direction and the touch sensing electrodes (RX) having 14 channels along the horizontal direction. It should be noticed that the active area of the in-cell mutual-capacitive touch panel are bilaterally symmetrical.

Figure 9:
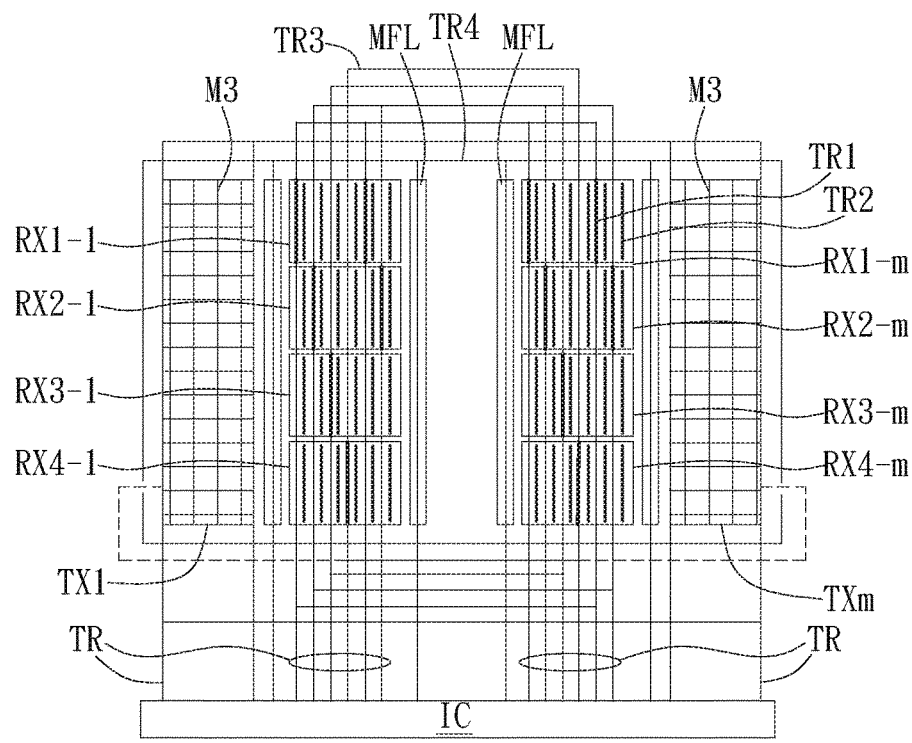
FIG. 9 illustrates a second embodiment of the layout of the in-cell mutual-capacitive touch panel of the invention.

Please refer to FIG. 9. FIG. 9 illustrates a second embodiment of the layout of the in-cell mutual-capacitive touch panel of the invention. In this embodiment, the in-cell mutual-capacitive touch panel uses the first direction electrode as the touch driving electrode (TX) and the second direction electrode as the touch sensing electrode (RX), but not limited to this. As shown in FIG. 9, it is assumed that the touch sensing electrodes RX1-1~RX1-$m$ belong to the same channel RX1, the touch sensing electrodes RX2-1~RX2-$m$ belong to the same channel RX2, the touch sensing electrodes RX3-1~RX3-$m$ belong to the same channel RX3 and the touch sensing electrodes RX4-1~RX4-$m$ belong to the same channel RX4. Taking the channel RX1 for example, horizontal traces TR3 are disposed above and under the in-cell mutual-capacitive touch panel to connect the touch sensing electrodes RX1-1~RX1-$m$ belong to the same channel RX1 to achieve the double routing design and reduce the resistance. In addition, because the touch sensing electrodes RX1-1~RX1-$m$ at the right side and the left side have traces TR entering into the control circuit IC respectively, the aim of multi-region driving can be achieved to reduce the RC loading. About the other channels RX2~RX4, since they are similar to the above-mentioned channel RX1, they will not be repeated here. As to the traces TR of the touch driving electrodes TX1 and TXm, they enter into the control circuit IC respectively; the traces TR of the multi-function electrodes MFL are connected together and then enter into the control circuit IC respectively.

The touch driving electrodes TX1 and TXm are formed by the first conductive layer M3 arranged in mesh type. A part of the common electrode CITO corresponding to the touch driving electrodes TX1 and TXm are electrically connected with the other parts of the common electrode CITO in the border area of the in-cell mutual-capacitive touch panel. And, a part of the first conductive layer M3 not forming the touch electrodes is used as the traces of the part of the common electrode CITO corresponding to the touch driving electrodes TX1 and TXm to reduce the resistance. The touch sensing electrodes RX1-1~RX4-1 and RX1-m~RX4-m are electrically connected with the touch sensing electrodes of the same channel in the border area of the in-cell mutual-capacitive touch panel through the traces TR3 and use the traces TR1 to electrically connect the common electrode CITO in the region corresponding to the touch sensing electrode through the via VIA to achieve the double routing design to reduce the resistance. The multi-function electrodes MFL are electrically connected with the other multi-function electrodes MFL in the border area of the in-cell mutual-capacitive touch panel through the traces TR4 and use the traces to electrically connect with the common electrode CITO in the region corresponding to the multi-function electrode MFL through the via VIA to achieve the double routing design to reduce the resistance.

Figure 10:
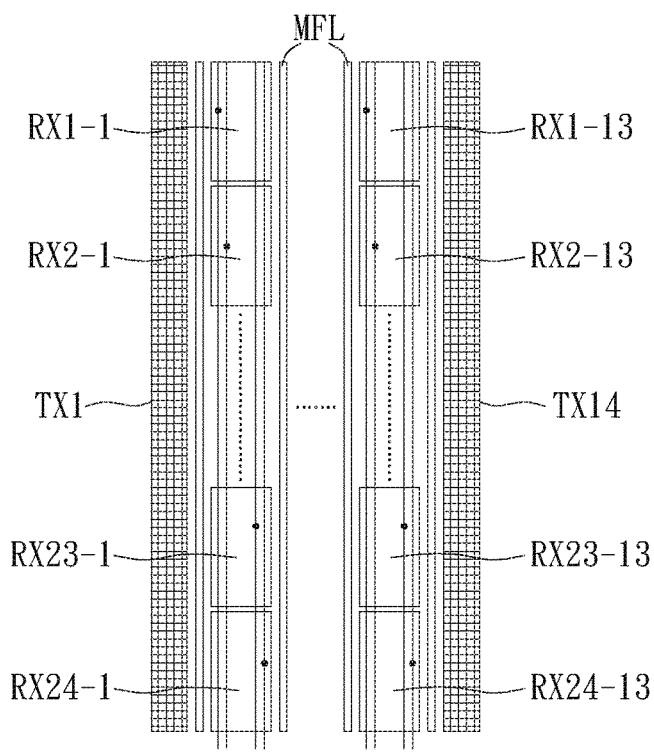
FIG. 10 illustrates a schematic diagram of the touch driving electrodes (TX) having 14 channels along the horizontal direction and the touch sensing electrodes (RX) having 24 channels along the vertical direction.

In practical applications, the traces TR1 of the touch sensing electrodes RX1-1~RX4-1 and RX1-m~RX4-m can be uniformly disposed or different numbers of the traces TR1 are disposed in different regions to achieve the best RC loading design. Taking the touch sensing electrodes RX1-1~RX4-1 for example, two traces TR1 are disposed in each of the touch sensing electrodes RX1-1~RX2-1 respectively and one trace TR1 is disposed in each of the touch sensing electrodes RX3-1~RX4-1 respectively, but not limited to this. In addition, the active area of the in-cell mutual-capacitive touch panel is surrounded by the traces TR4 of the multi-function electrode MFL in the border area of the in-cell mutual-capacitive touch panel to achieve the shielding effect. Please also refer to FIG. 10. FIG. 10 illustrates a schematic diagram of the touch driving electrodes (TX) having 14 channels along the horizontal direction and the touch sensing electrodes (RX) having 24 channels along the vertical direction. It should be noticed that the active area of the in-cell mutual-capacitive touch panel are bilaterally symmetrical.

Figure 11:
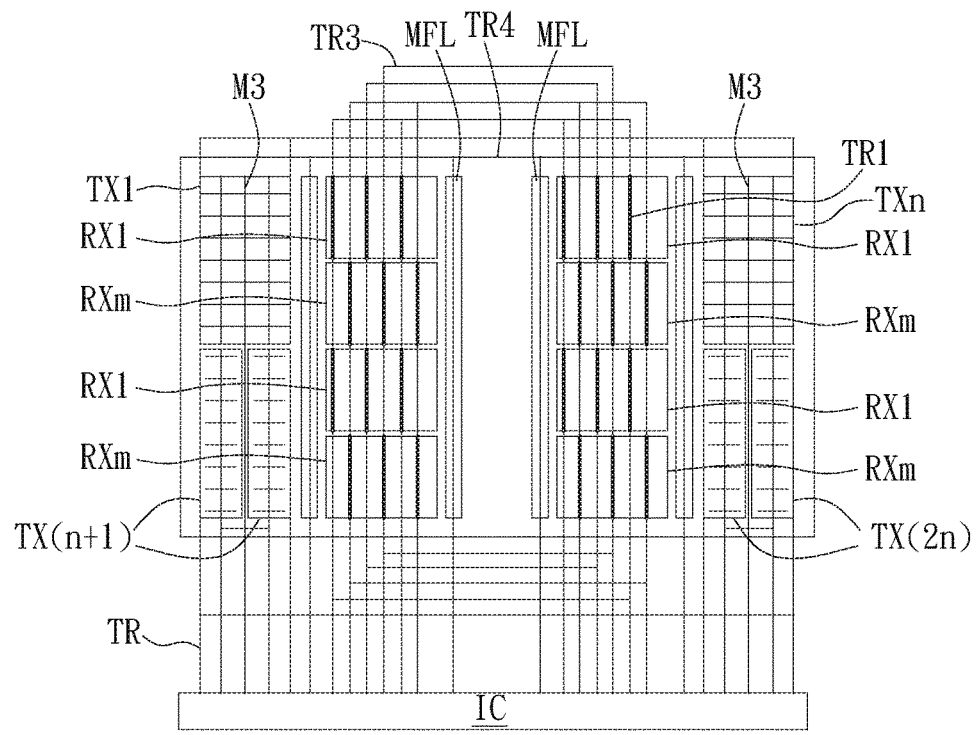
FIG. 11 illustrates a third embodiment of the layout of the in-cell mutual-capacitive touch panel of the invention.

Please refer to FIG. 11. FIG. 11 illustrates a third embodiment of the layout of the in-cell mutual-capacitive touch panel of the invention. In this embodiment, the in-cell mutual-capacitive touch panel uses the first direction electrode as the touch sensing electrodes (RX) and the second direction electrode as the touch driving electrodes (TX), but not limited to this. It should be noticed that the difference between FIG. 11 and FIG. 9 is: the touch driving electrodes (TX) of FIG. 11 can be divided into a first group of electrodes TX1 and a second group of electrodes TX(n+1). And, the traces of the first group of electrodes TX1 will pass through the second group of electrodes TX(n+1) without any electrical connections between the traces of the first group of electrodes TX1 and the second group of electrodes TX(n+1). The first group of electrodes TX1 in this embodiment is formed by one touch driving electrode TX and the second group of electrodes TX(n+1) in this embodiment is formed by two touch driving electrodes TX(n+1), but not limited to this.

Figure 12:
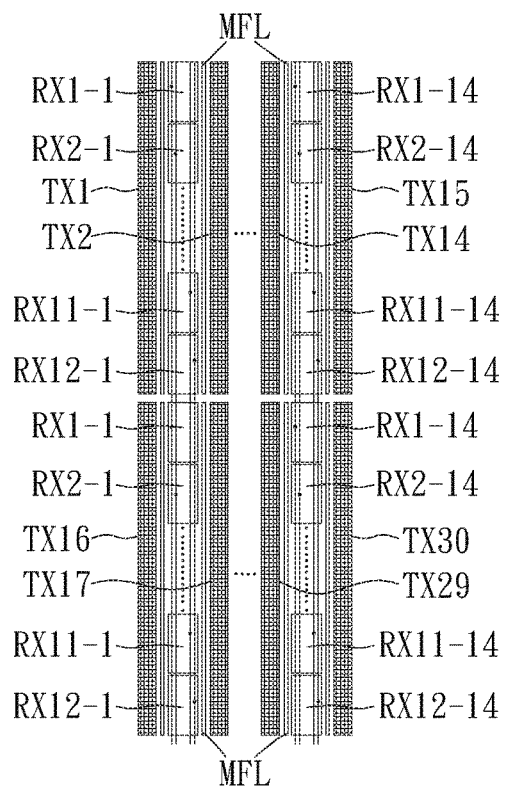
FIG. 12 illustrates a schematic diagram of the touch sensing electrodes (RX) having 12 channels along the vertical direction and the touch driving electrodes (TX) having 30 channels along the horizontal direction.

In fact, the two touch driving electrodes TX(n+1) of the second group of electrodes TX(n+1) are electrically connected. Similarly, the two touch driving electrodes TX(2n) of the second group of electrodes TX(2n) are electrically connected, and so on. In addition, a part of the common electrode corresponding to the first group of electrodes TX1 and another part of the common electrode corresponding to the second group of electrodes TX(n+1) are belonged to the same common electrode region or different common electrode regions respectively without any specific limitations. FIG. 12 illustrates a schematic diagram of the touch sensing electrodes (RX) having 12 channels along the vertical direction and the touch driving electrodes (TX) having 30 channels along the horizontal direction. It should be noticed that the active area of the in-cell mutual-capacitive touch panel are bilaterally symmetrical.

It should be noticed that the touch driving electrodes (TX) defined in the first embodiment, the second embodiment and the third embodiment mentioned above can be also defined as touch sensing electrodes (RX) in other embodiments depending on practical needs. Similarly, the touch sensing electrodes (RX) defined in the first embodiment, the second embodiment and the third embodiment mentioned above can be also defined as touch driving electrodes (TX) depending on practical needs.

Figure 13A:
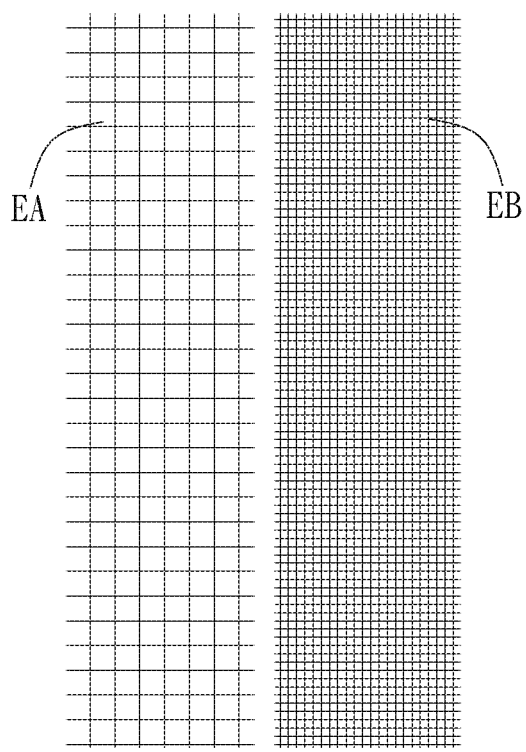
FIG. 13A and FIG. 13B illustrate schematic diagrams of the mesh-type touch electrodes of the in-cell mutual-capacitive touch panel having linear edges or non-linear edges.
Figure 13B:
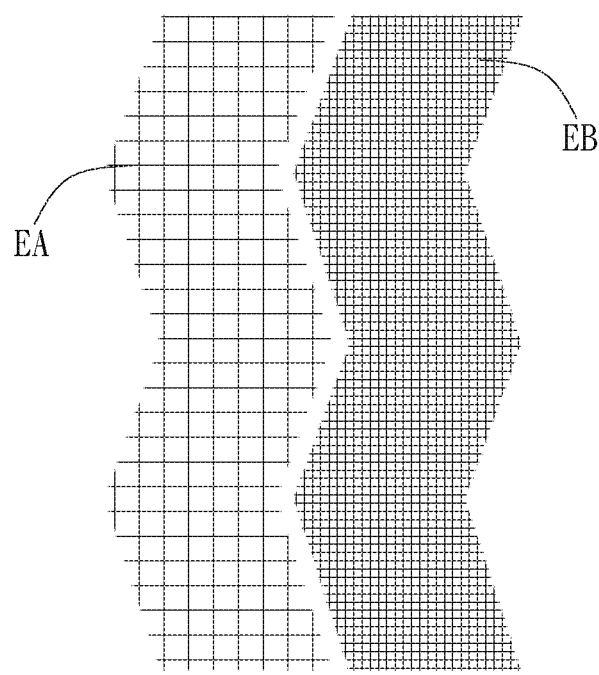

It should be noticed that the various kinds of single-layer touch electrode patterns can be realized by the laminated structure of the in-cell mutual-capacitive touch panel of the invention. In fact, the shapes of the touch electrodes EA and EB can be designed to be any geometry based on practical needs, such as regular shapes or irregular shapes. And, the shapes of the edges of the touch electrodes can be designed to be regular shapes (e.g., the linear edge shown in FIG. 13A) or irregular shapes as shown in FIG. 13B without any specific limitations.

Figure 14:
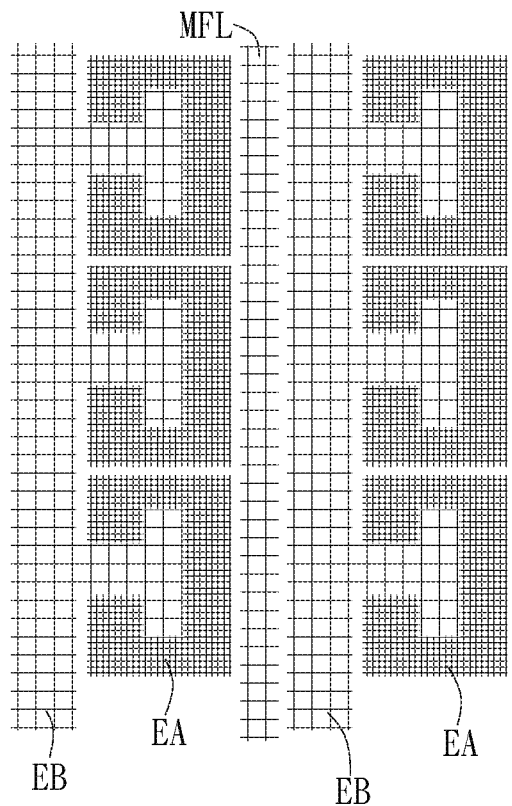
FIG. 14 illustrates a schematic diagram of the mesh-type touch electrodes of the in-cell mutual-capacitive touch panel having multi-function electrodes.

Please refer to FIG. 14. FIG. 14 illustrates a schematic diagram of the mesh-type touch electrodes of the in-cell mutual-capacitive touch panel having multi-function electrodes MFL. As shown in FIG. 14, the touch electrodes EA and EB can be used as touch driving electrodes (TX) or touch sensing electrodes (RX) respectively. For example, the touch electrode EA is used as the touch driving electrode (TX) and the touch electrode EB is used as the touch sensing electrodes (RX) or the touch electrode EA is used as the touch sensing electrodes (RX) and the touch electrode EB is used as the touch driving electrode (TX).

In fact, the touch electrodes EA and EB can be both formed by the first conductive layer M3 arranged in mesh type, or as the above-mentioned embodiments that one of the touch electrodes EA and EB is formed by the first conductive layer M3 arranged in mesh type and the other of the touch electrodes EA and EB is electrically connected with the common electrode CITO without any specific limitations. As to the multi-function electrodes MFL, the multi-function electrodes MFL can be disposed between the driving electrodes (TX) and the sensing electrodes (RX) and the multi-function electrodes MFL can be also formed by the first conductive layer M3 arranged in mesh type, but not limited to this.

It should be noticed that, in practical applications, the common electrode in the in-cell mutual-capacitive touch panel of the invention can have only single common electrode region or a plurality of common electrode regions without any specific limitations. The single common electrode region or the plurality of common electrode regions of the common electrode will overlap the touch electrodes of the in-cell mutual-capacitive touch panel. The in-cell mutual-capacitive touch panel of the invention can be operated in a display mode and a touch mode at different times. That is to say, the display mode and the touch mode of the in-cell mutual-capacitive touch panel are driven in a time-sharing way.

Figure 15A:
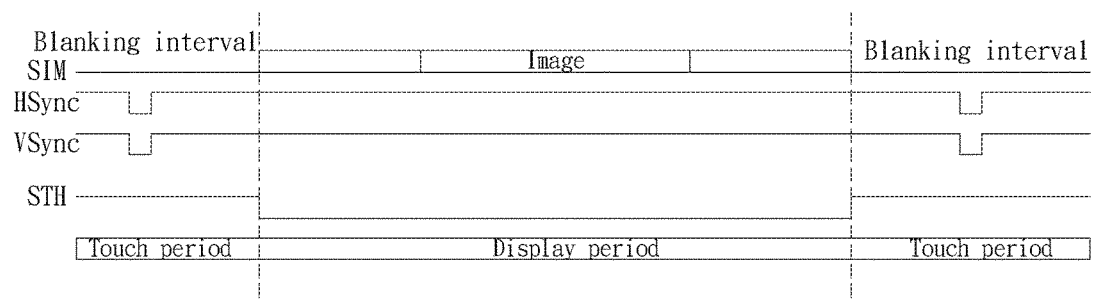
FIG. 15A illustrates a schematic diagram of the in-cell mutual-capacitive touch panel operated in the touch mode by outputting touch driving signals during the blanking interval of the image signal.

Please also refer to FIG. 15A. As shown in FIG. 15A, the in-cell mutual-capacitive touch panel is operated in the touch mode by outputting touch driving signals STH during the blanking interval of the image signal SIM. And, the in-cell mutual-capacitive touch panel will perform touch sensing during the non-display timing (namely the blanking interval).

Figure 15B:
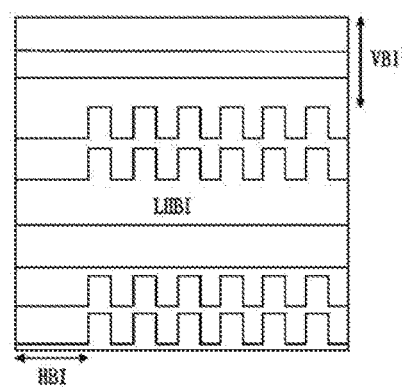
FIG. 15B illustrates a schematic diagram of the vertical blanking interval (VBI), the horizontal blanking interval (HBI), and the long horizontal blanking interval respectively.

Please refer to FIG. 15B. FIG. 15B illustrates a schematic diagram of the vertical blanking interval (VBI), the horizontal blanking interval (HBI), and the long horizontal blanking interval (LHBI) respectively. In practical applications, the in-cell mutual-capacitive touch panel can use different types of blanking intervals based on different driving ways. As shown in FIG. 15B, the blanking interval can include at least one VBI, a HBI, and a LHBI. A time length of the LHBI is equal to or larger than a time length of the HBI. The LHBI can be obtained by redistributing a plurality of HBIs or the LHBI includes the VBI.

Figure 16:
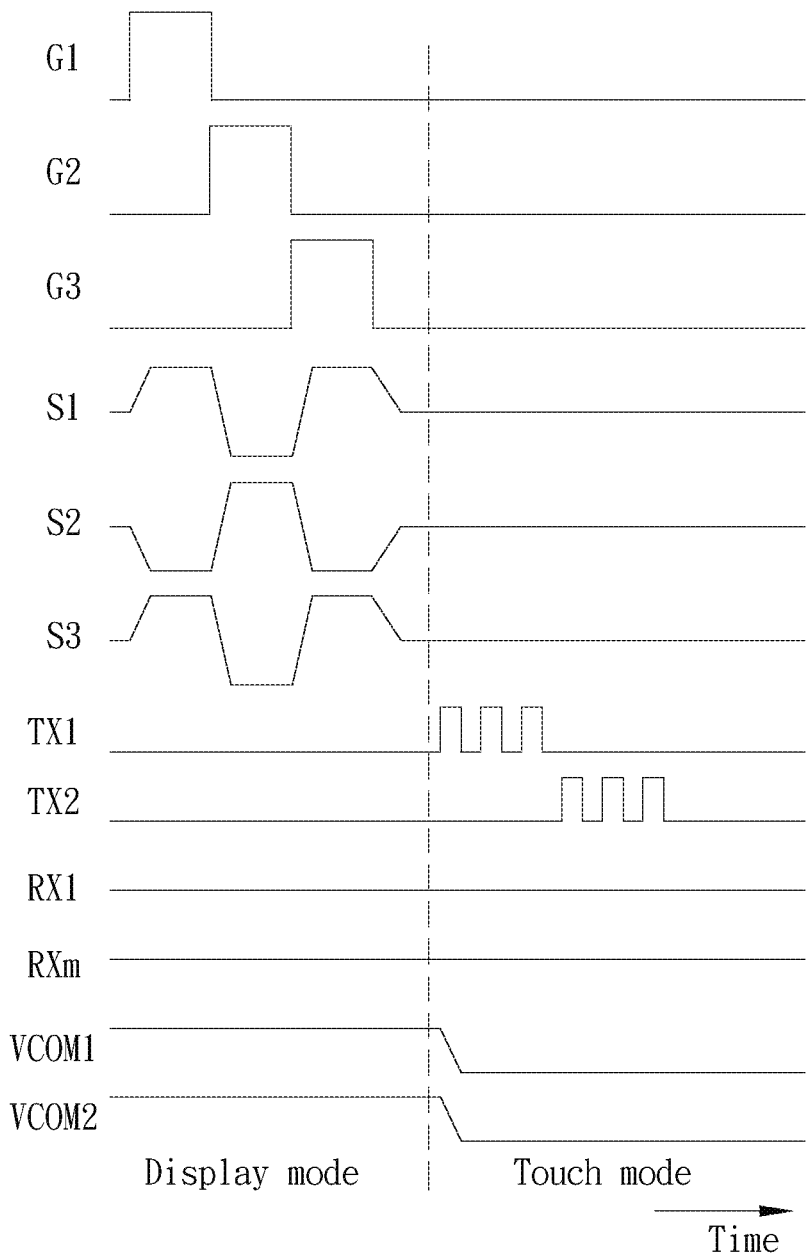
FIG. 16 illustrates a timing diagram of the in-cell mutual-capacitive touch panel of FIG. 7 operated in the display mode and the touch mode respectively.

Please refer to FIG. 7 and FIG. 16 at the same time. It is assumed that the touch sensing electrodes RX1~RXm in FIG. 7 correspond to different common electrode regions VCOM1~VCOMm respectively. As shown in FIG. 16, when the in-cell mutual-capacitive touch panel is operated in the display mode, the gate driver and the source driver will output gate driving signals G1~G3 and source driving signals S1~S3 respectively to drive the pixels of the in-cell mutual-capacitive touch panel to display images; when the in-cell mutual-capacitive touch panel is operated in the touch mode, the touch driving electrodes TX1~TX2 are provided touch signals respectively and the common electrode regions VCOM1~VCOMm are switched to a floating state.

Figure 17A:
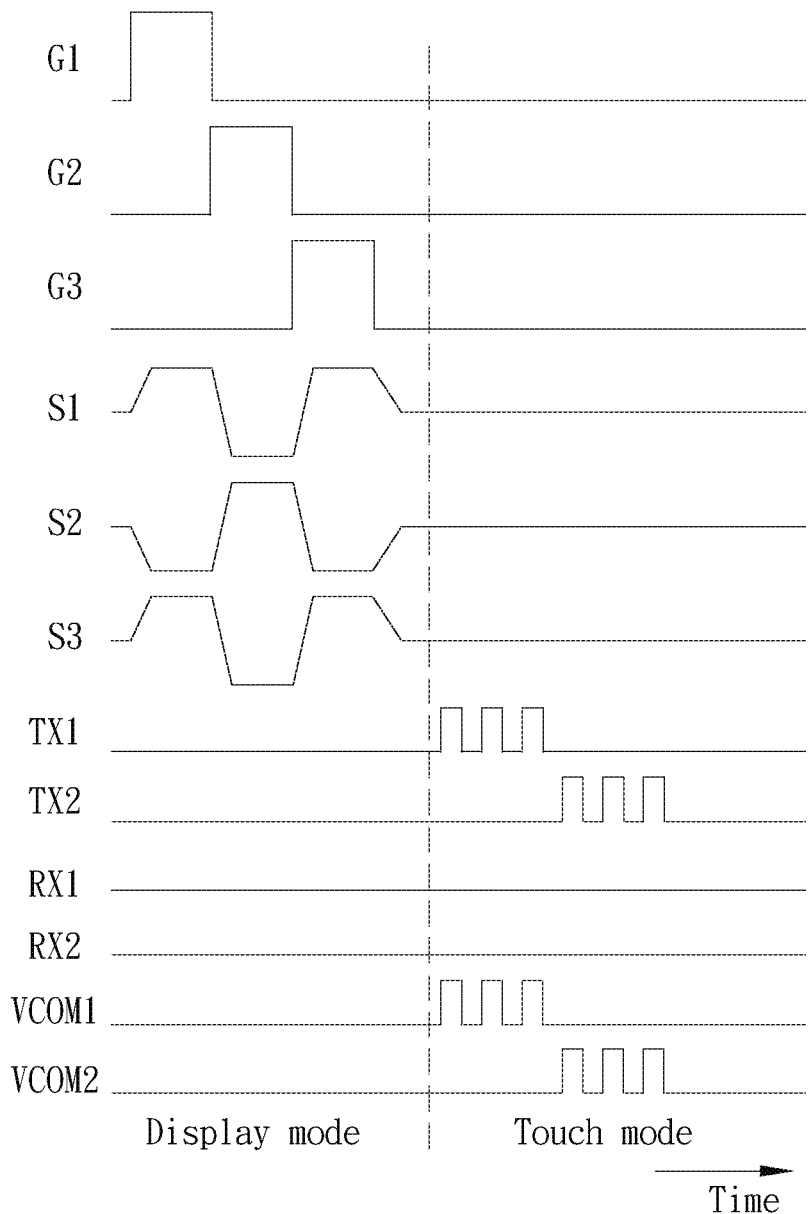
FIG. 17A and FIG. 17B illustrate timing diagrams of the in-cell mutual-capacitive touch panel of FIG. 9 operated in the display mode and the touch mode respectively.
Figure 17B:
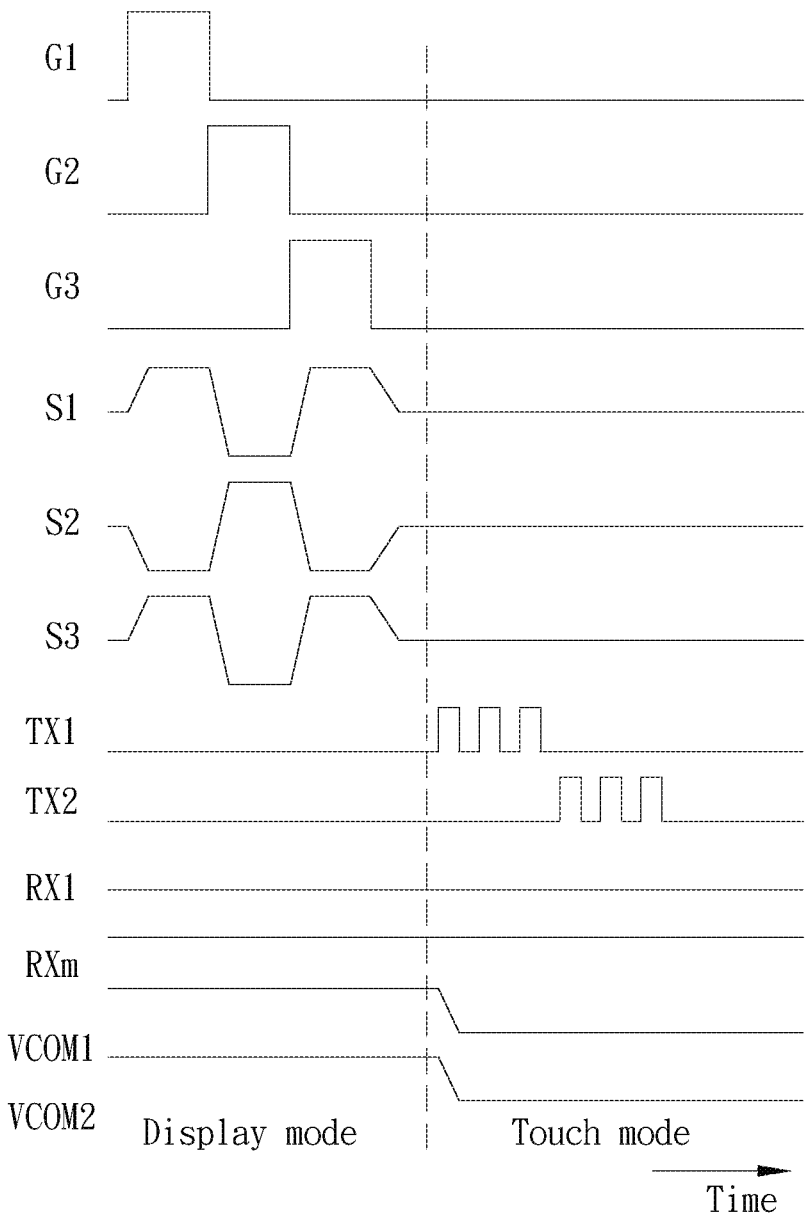

Please refer to FIG. 9 and FIG. 17A~FIG. 17B at the same time. It is assumed that the touch driving electrodes TX1~TX2 in FIG. 9 correspond to different common electrode regions VCOM1~VCOM2 respectively. As shown in FIG. 17A-FIG. 17B, when the in-cell mutual-capacitive touch panel is operated in the display mode, the gate driver and the source driver will output gate driving signals G1~G3 and source driving signals S1~S3 respectively to drive the pixels of the in-cell mutual-capacitive touch panel to display images; when the in-cell mutual-capacitive touch panel is operated in the touch mode, the touch driving electrodes TX1~TX2 are provided touch signals respectively and the common electrode regions VCOM1~VCOM2 are correspondingly provided a touch related signal having the same frequency, the same amplitude or the same phase with the touch signals in order (as shown in FIG. 17A) or the common electrode regions VCOM1~VCOM2 are switched to the floating state (as shown in FIG. 17B).

Figure 18:
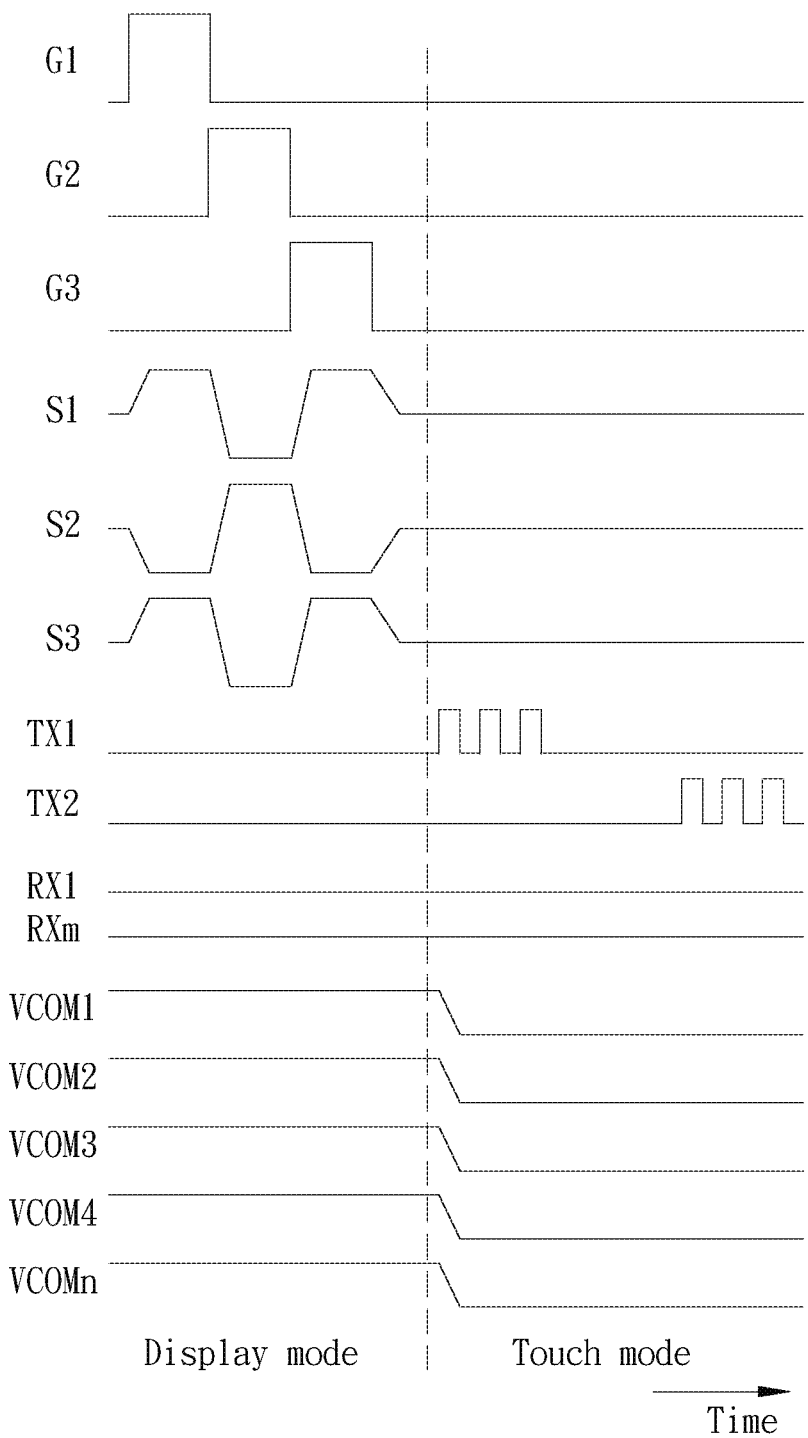
FIG. 18 illustrates a timing diagram of the in-cell mutual-capacitive touch panel of FIG. 11 operated in the display mode and the touch mode respectively.

Please refer to FIG. 11 and FIG. 18 at the same time. It is assumed that the touch driving electrodes TX1 and TX(n+1) in FIG. 11 correspond to the same common electrode region VCOM1 and the touch driving electrodes TXn and TX(2n) in FIG. 11 correspond to the same common electrode region VCOMn. As shown in FIG. 18, when the in-cell mutual-capacitive touch panel is operated in the display mode, the gate driver and the source driver will output gate driving signals G1~G3 and source driving signals S1~S3 respectively to drive the pixels of the in-cell mutual-capacitive touch panel to display images; when the in-cell mutual-capacitive touch panel is operated in the touch mode, the touch driving electrodes TX1~TX(2n) are provided touch signals respectively and the common electrode regions VCOM1~VCOMn are switched to the floating state (as shown in FIG. 18).

Compared to the prior arts, the in-cell mutual-capacitive touch panel of the invention has the following advantages and effects:

(1) Designs of the touch sensing electrodes and their traces in the in-cell mutual-capacitive touch panel of the invention are simple.

(2) The original aperture ratio of the in-cell mutual-capacitive touch panel will not affected by the layout method of the invention.

(3) The RC loading of the common electrode can be reduced.

(4) When the in-cell mutual-capacitive touch panel is operated in touch mode, the common electrode is controlled simultaneously to reduce entire RC loading of the in-cell mutual-capacitive touch panel.

(5) The touch mode and the display mode of the in-cell mutual-capacitive touch panel are driven in a time-sharing way to enhance the signal-noise ratio (SNR).

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An in-cell mutual-capacitive touch panel, comprising:
a plurality of pixels, a laminated structure of each pixel comprising:
a substrate;
a thin-film transistor layer disposed on the substrate, wherein a first conductive layer and a common electrode are disposed in the TFT layer, and the first conductive layer is arranged in mesh type or only arranged along a first direction in an active area of the in-cell mutual-capacitive touch panel;
a liquid crystal layer disposed above the thin-film transistor layer;
a color filter layer disposed above the liquid crystal layer; and
a glass layer disposed above the color filter layer;
wherein touch electrodes of the in-cell mutual-capacitive touch panel comprises a first direction electrode and a second direction electrode, the first direction electrode is formed by the first conductive layer arranged in mesh type and the second direction electrode is formed by the first conductive layer arranged along the first direction in the active area electrically connected with the common electrode through a via;
wherein a multi-function electrode is disposed between the first direction electrode and the second direction electrode; the multi-function electrode is formed by the first conductive layer arranged along the first direction in the active area electrically connected with the common electrode through a via.

2. The in-cell mutual-capacitive touch panel of claim 1, wherein the first direction electrode and the second direction electrode are a driving electrode and a sensing electrode respectively or the first direction electrode and the second direction electrode are the sensing electrode and the driving electrode respectively.

3. The in-cell mutual-capacitive touch panel of claim 1, wherein the first conductive layer is formed after the common electrode is formed.

4. The in-cell mutual-capacitive touch panel of claim 1, wherein the first conductive layer is formed before the common electrode is formed.

5. The in-cell mutual-capacitive touch panel of claim 1, wherein the color filter layer comprises a color filter and a black matrix resist, the black matrix resist has light resistance, and the first conductive layer is disposed under the black matrix resist.

6. The in-cell mutual-capacitive touch panel of claim 1, wherein the thin-film transistor layer further comprises an original conductive layer; the original conductive layer is electrically connected with the common electrode to reduce RC loading of the common electrode.

7. The in-cell mutual-capacitive touch panel of claim 1, wherein when the laminated structure has a half source driving (HSD) structure, the laminated structure comprises an additional vacated source line space for electrically connecting an original conductive layer of the thin-film transistor layer with the first conductive layer or the common electrode.

8. The in-cell mutual-capacitive touch panel of claim 7, wherein the original conductive layer and a source and a drain of the thin-film transistor layer are formed simultaneously.

9. The in-cell mutual-capacitive touch panel of claim 1, wherein the second direction electrodes in the same channel are electrically connected in a border area of the in-cell mutual-capacitive touch panel through traces.

10. The in-cell mutual-capacitive touch panel of claim 9, wherein traces of the second direction electrode are uniformly disposed or different numbers of the traces are disposed in different regions.

11. The in-cell mutual-capacitive touch panel of claim 1, wherein a part of the common electrode corresponding to the first direction electrode is electrically connected with another part of the common electrode in a border area of the in-cell mutual-capacitive touch panel.

12. The in-cell mutual-capacitive touch panel of claim 11, wherein a plurality of the first direction electrode is divided into a first group of electrodes and a second group of electrodes; traces of the first group of electrodes and the second group of electrodes are arranged without any electrical connections between the traces of the first group of electrodes and the second group of electrodes.

13. The in-cell mutual-capacitive touch panel of claim 12, wherein two first direction electrodes of the second group of electrodes are electrically connected.

14. The in-cell mutual-capacitive touch panel of claim 12, wherein a part of the common electrode corresponding to the first group of electrodes and another part of the common electrode corresponding to the second group of electrodes are part of the same common electrode region or different common electrode regions respectively.

15. The in-cell mutual-capacitive touch panel of claim 1, wherein the multi-function electrode is electrically connected with other multi-function electrodes in a border area of the in-cell mutual-capacitive touch panel through traces.

16. The in-cell mutual-capacitive touch panel of claim 15, wherein the active area of the in-cell mutual-capacitive touch panel is surrounded by traces of the multi-function electrode in the border area of the in-cell mutual-capacitive touch panel.

17. The in-cell mutual-capacitive touch panel of claim 1, wherein when the in-cell mutual-capacitive touch panel is operated in a touch mode, the common electrode is switched to a floating state or provided a touch related signal having the same frequency, the same amplitude or the same phase with a touch signal.

18. The in-cell mutual-capacitive touch panel of claim 1, wherein a touch mode and a display mode of the in-cell mutual-capacitive touch panel are driven in a time-sharing way; the in-cell mutual-capacitive touch panel is operated in the touch mode during a blanking interval of a display period.

19. The in-cell mutual-capacitive touch panel of claim 18, wherein the blanking interval comprises at least one of a vertical blanking interval (VBI), a horizontal blanking interval (HBI), and a long horizontal blanking interval (LHBI); a time length of the LHBI is equal to or larger than a time length of the HBI; the LHBI is obtained by redistributing a plurality of HBIs or the LHBI comprises the VBI.

20. The in-cell mutual-capacitive touch panel of claim 18, wherein the common electrode has a plurality of common electrode regions overlapped with a plurality of touch electrodes of the in-cell mutual-capacitive touch panel respectively; when the in-cell mutual-capacitive touch panel is operated in the touch mode, the plurality of touch electrodes is provided a plurality of touch signals in order and the common electrode is provided a plurality of touch related signals having the same frequency, the same amplitude or the same phase with the plurality of touch signals in order correspondingly or the common electrode is in a floating state.

21. The in-cell mutual-capacitive touch panel of claim 20, wherein the plurality of touch electrodes is driving electrodes or sensing electrodes.

* * * * *